United States Patent [19]

Hashimoto

[11] 4,166,685
[45] Sep. 4, 1979

[54] BLADED SHUTTER FOR CAMERA WITH FOCAL PLANE SHUTTER

[75] Inventor: Akihiko Hashimoto, Hachioji, Japan

[73] Assignee: Olympus Optical Co., Ltd., Tokyo, Japan

[21] Appl. No.: 753,624

[22] Filed: Dec. 23, 1976

[30] Foreign Application Priority Data

Feb. 16, 1976 [JP] Japan .................................. 51/15593

[51] Int. Cl.² ............................ G03B 9/00; G03B 9/08
[52] U.S. Cl. ..................................... 354/231; 354/236
[58] Field of Search ............... 354/230, 231, 233, 253, 354/252, 259, 260, 126, 129, 139, 146, 149, 232, 236, 226, 286, 262, 295

[56] References Cited

U.S. PATENT DOCUMENTS

| 2,620,712 | 12/1952 | Clifford | 354/233 |
|---|---|---|---|
| 2,708,395 | 5/1955 | Wagner et al. | 354/146 |
| 3,108,528 | 10/1963 | Rentschler | 354/231 |
| 3,662,664 | 5/1972 | Goshima | 354/230 |
| 3,675,561 | 7/1972 | Schwarz | 354/139 |
| 3,703,136 | 11/1972 | Schwarz | 354/236 X |
| 3,757,655 | 9/1973 | Kobayashi | 354/252 X |
| 3,953,865 | 4/1976 | Matsumoto | 354/230 X |
| 3,994,007 | 11/1976 | Uchiyama et al. | 354/230 X |
| 4,016,584 | 4/1977 | Sato et al. | 354/236 X |
| 4,041,511 | 8/1977 | Ketai et al. | 354/262 X |

*Primary Examiner*—Donald A. Griffin
*Attorney, Agent, or Firm*—Ostrolenk, Faber, Gerb & Soffen

[57] ABSTRACT

A bladed shutter is assembled into an interchangeable lens of a camera with a focal plane shutter, and comprises a plurality of shutter blades for opening and closing a taking light path, a pair of shutter opening and shutter closing rings for respectively opening and closing the shutter blades, a shutter opening governor for controlling the operation of the shutter opening ring, a shutter closing governor for controlling the operation of the shutter closing ring, a diaphragm mechanism for limiting the extent of rotation of the shutter opening ring to adjust the degree of opening of the shutter blades, a shutter cam for adjusting the degree of engagement between the shutter closing governor and the shutter closing ring, and a shutter charging mechanism interlocked with a drive lever provided on the part of the camera for energizing the shutter opening ring and the shutter closing ring. The focal plane shutter is operated at a slow rate while the bladed shutter is effective to provide a necessary photographic operation.

10 Claims, 7 Drawing Figures

BLADED SHUTTER FOR CAMERA WITH FOCAL PLANE SHUTTER

BACKGROUND OF THE INVENTION

The invention relates to a bladed shutter for a camera with a focal plane shutter.

When a high speed shutter operation is required as in taking pictures during daytime using a strobo unit, a bladed shutter which assures a full shutter opening is much more advantageous than a focal plane shutter which does not provide a full shutter opening but instead achieves an exposure through the running of a slit across a film plane. For this reason, an interchangeable lens having a bladed shutter assembled therein is prepared for use with a camera with a focal plane shutter. However, conventional interchangeable lens of this kind are provided with a shutter drive mechanism which is separate from the camera, so that a charging operation of the bladed shutter must be performed separately as a film winding operation of the camera takes place, resulting in a troublesome operation.

SUMMARY OF THE INVENTION

It is an object of the invention to provide a novel bladed shutter for a camera with a focal plane shutter.

In accordance with the invention, a plurality of shutter blades of a bladed shutter are opened and closed by means of a shutter opening ring and a shutter closing ring respectively. The shutter is charged by utilizing a drive lever such as a diaphragm lever provided on the camera. The opening and closing movements of the bladed shutter are automatically achieved in response to a shutter release operation.

The bladed shutter of the invention can be utilized to convert a camera with a focal plane shutter into a bladed shutter camera, thus facilitating the taking of pictures during the daytime while using a strobo unit. The shutter closing ring and the shutter opening ring rotate in the same direction to provide a required exposure by opening the shutter blades to a degree which is controlled by governors, a diaphragm presetting lever and a shutter closing controlling lever. This avoids imposing an undue stressing upon the shutter assembly. The charging of the shutter takes place in the same direction as the direction in which both rings are operated, and does not require an excessively large amount of energy, so that it may be easily interlocked with a diaphragm lever provided on the camera, thus achieving a high speed operation in a simple manner. Since the operation of the bladed shutter of the invention is automated from the initial charging step, it can be simply operated. In addition, the general arrangement is as simple as a diaphragm mechanism of a conventional bladed shutter, so that it can be easily applied to a lens having a large aperture, and the bladed shutter can be inexpensively provided. In addition, it may be equipped with an operation converting lever, so that it may be used as a usual bladed shutter.

DESCRIPTION OF PREFERRED EMBODIMENT

Figure 1:
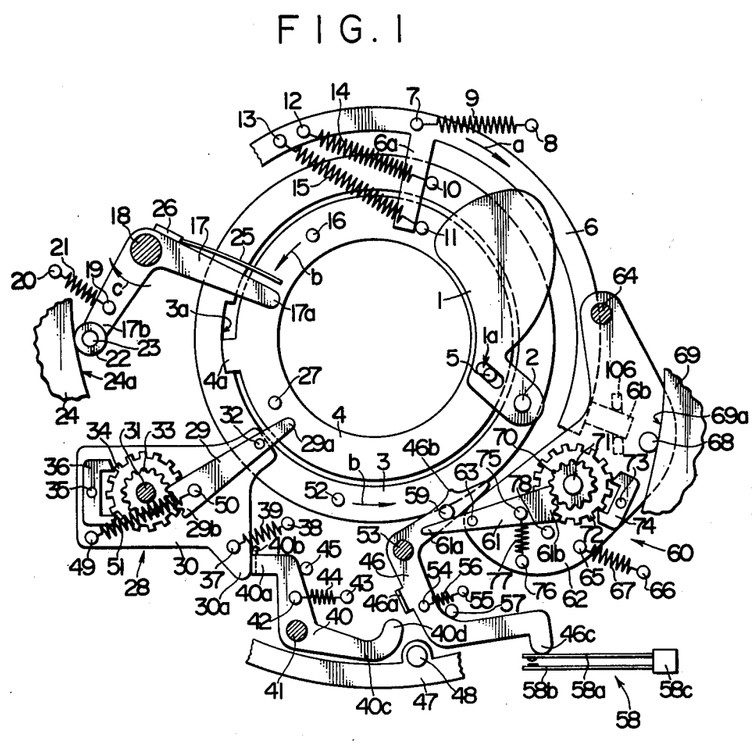
FIGS. 1 to 4 are front views of a bladed shutter for camera with focal plane shutter which is constructed in accordance with one embodiment of the invention, these Figures also illustrating the manner of operation.

Referring to FIG. 1, there is shown a shutter blade 1, one end of which is rotatably mounted by a pin 2 on a shutter closing ring 3. Adjacent to the pin 2, the shutter blade 1 is formed with an elongated slot 1a, into which is fitted a pin 5 fixedly mounted on a shutter opening ring 4. Rings 3, 4 are rotatably disposed in concentric relationship with each other, and operate in an interrelated manner by engagement of a projection 4a on the left-hand outer periphery of the shutter opening ring 4 with a notch 3a formed in the left-hand inner periphery of the shutter closing ring 3.

The shutter closing ring 3 is externally surrounded by a shutter charging ring 6 which is rotatably mounted in concentric relationship with both rings 3, 4. A coiled spring 9 extends between a pin 7 fixedly mounted on the upper portion of the ring 6 and a stationary pin 8 and urges the ring 6 to rotate in the direction indicated by an arrow a. The ring 6 has a radially inwardly extending arm 6a in its upper portion, which is urged by the coiled spring 9 to bear against a pair of pins 10, 11 which are in turn fixedly mounted on the shutter closing ring 3 and the shutter opening 4, respectively. The ring 6 fixedly carries a pair of pins 12, 13 on its portion to the left of the pin 7. A pair of shutter charging, coiled springs 14, 15 extend between the pins 12, 13 and the pins 10, 11, respectively. The ring 6 has a radially outwardly extending arm 6b, on its right-hand portions, which is engaged by a diaphragm lever 106 which is attached to the camera.

In its upper, left-hand portion as viewed in FIG. 1, the shutter opening ring 4 fixedly carries a diaphragm pin 16, one arm 17a of a diaphragm presetting lever 17 is located in the circular path of movement of the pin 16, indicated by an arrow 17. The diaphragm presetting lever is rotatably mounted on a stud 18. The lever includes another arm 17b having a pin 19 fixedly mounted thereon. A coiled spring 21, extending between the pin 19 and a stationary pin 20, urges the lever 17 to rotate in the direction indicated by an arrow c. The free end of the arm 17b has a pivot 23 on which a roller 22 is rotatably mounted. The roller 22 is held in abutment against a cam edge 24a of a diaphragm cam 24 under the resilience of the coiled spring 21. A mounting member 26, located adjacent stud 18, mounts one end of a buffering leaf spring 25 of arm 17a of the lever on the upper edge 17. The free end of the leaf spring is located in the path of movement of diaphragm pin 16 so as to provide a buffering action thereon as pin 16 bears against arm 17a. The diaphragm pin 16, the diaphragm presetting lever 17 and the diaphragm cam 24 together constitute a diaphragm mechanism of the bladed shutter.

A governor pin 27 for braking the opening movement of the shutter is fixedly mounted on the lower, left-hand portion of the shutter opening ring 4. A braking arm 29a of a sector-shaped gear 29 is located in the path of movement of pin 27 which moves in the direction indicated by arrow "b". The breaking arm 29a is associated with a governor 28 which is designed to apply a braking action upon the opening movement of the shutter. The governor 28 includes a support plate 30 which is rotatably mounted on a shaft 31. The sector-shaped gear 29 is rotatably mounted on another pin 32 which is fixedly mounted on the support plate 30 in the right-hand portion thereof. The sector-shaped gear 29 has teeth 29b which mesh with a pinion 33 rotatably mounted on the shaft 31. An escape wheel 34 is integrally formed with the pinion 33 and meshes with an anchor 36 which is pivotally mounted on a pin 35 fixedly mounted on the support plate 30. A pin 37 is fixedly mounted on the support plate 30 in the lower, right-hand portion thereof, and a coiled spring 39 extends between the pin 37 and a stationary pin 38 for urging the support plate 30 to rotate counter-clockwise about the shaft 31. As a result the support plate 30 has its lower, right-hand lateral edge 30a held in abutment against a folded end 40b of an arm 40a of an operation converting lever 40. The operation converting lever 40 is rotatably mounted on a stud 41, and is biased by a coiled spring 44, extending between a pin 42 fixedly mounted thereon and a stationary pin 43, to have its arm 40a in bearing arrangement with a stop 45. The lever 40 includes another arm 40c which is formed with a detent 40d, located adjacent to a projection 46a formed on one arm of a control lever 46 (which will be described in further detail later) controlling the closing movement of the shutter. At a position below the arm 40c, a switching pin 48 is fixedly mounted on an operation switching ring 47. In the initial condition shown in FIG. 1, the detent 40d of the operation converting lever 40 is displaced from projection 46a, and the switching pin 48 is displaced from the arm 40c of the operation converting lever 40. A pin 49 is fixedly mounted on the lower, left hand portion of support plate 30, and a pin 50 is fixedly mounted on the sector-shaped gear 50 adjacent to the teeth 29b. A coiled spring 51 extends between the pins 49 and 50 and adjusts the position of the sector-shaped gear 29 in a manner such that the braking arm 29a of the gear 29 is just located on the path of movement of the governor pin 27 when the support plate is in its initial condition shown in FIG. 1. Under this condition, a leading one of the teeth 29b of the gear 29 meshes with the pinion 33.

A governor pin 52 is fixedly mounted on the shutter closing ring 3 and controls the closing movement of the shutter. The pin 52 moves along a path which is similar to the direction of the path of movement of the governor pin 27, as indicated by the arrow b. A braking tab 46b is formed on the upper edge of another arm of the control lever 46 and is located in this path.

The control lever 46 is pivotally mounted on a stud 53, and is biased to rotate counter-clockwise about stud 53 by a coiled spring 56 extending between a pin 54 and a stationary pin 55. Pin 54 is fixedly mounted on lever 46 adjacent to the portion 46a. As a result, the arm of the lever 46 which contains the pin 54 is held in abutment against a stop 57. One arm of the lever 46 extends to the right, as viewed in FIG. 1, and has a switch actuator 46c on its free end. The switch actuator is located adjacent to one resilient contact blade 58a of an X contact switch 58. The switch 58 includes another resilient contact blade 58b, which together with the contact blade 58a is mounted on an insulating support 58c. The switch 58 is of a normally open type, and remains open in the initial condition shown in FIG. 1.

The arm of the control lever 46 which contains the braking tab 46b has a pressure pin 59 fixedly mounted thereon. The pressure pin 59 bears against a braking arm 61a of a sector-shaped gear 61. The gear 61 forms part of a governor 60 which controls the closing movement of the shutter. The sector-shaped gear 61 is rotatably mounted on a pin 63 which is fixedly mounted on the left-hand end of a support plate 62 of the governor 60. The support plate 62 has one end (the upper portion thereof as viewed in FIG. 1) rotatably mounted on a shaft 64, and is urged to rotate counter-clockwise about the shaft 64 by a coiled spring 67. The coiled spring 57 extends between a pin 65 fixedly mounted on the lower portion of plate 62 and a stationary pin 66. As a result, pin 68 fixedly mounted on the right-hand side of the central portion of plate 62 bears against a cam edge 69a of a shutter cam 69. The support plate 62 centrally carries a shaft 71 on which a pinion 70 is rotatably mounted and meshes with the teeth 61b of the gear 61. An escape wheel 72 integral with the pinion 70 is mounted on the shaft 71, and is engaged by an anchor 74 which is rotatably mounted on a pin 73 which is in turn fixedly mounted on the support plate 62. A pin 75 is fixedly mounted on the gear 61 intermediate the pin 63 and the teeth 61b, and is engaged by one end of a coiled spring 77. The other end of spring 77 is anchored to a pin 76 which is fixedly mounted on the support plate 62. As a result, the gear 61 is urged in a direction to normally maintain the braking arm 61a in abutment against the pressure pin 59 on the control lever 46. The extent of rotation of the gear 61 is limited by a stop 78 which is fixedly mounted on the support plate 62.

Figure 2:
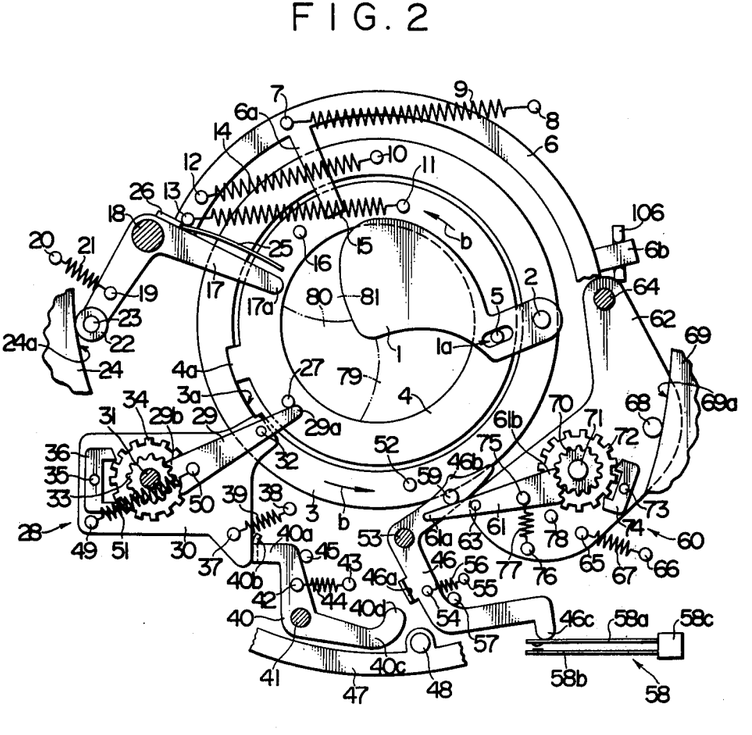
Figure 3:
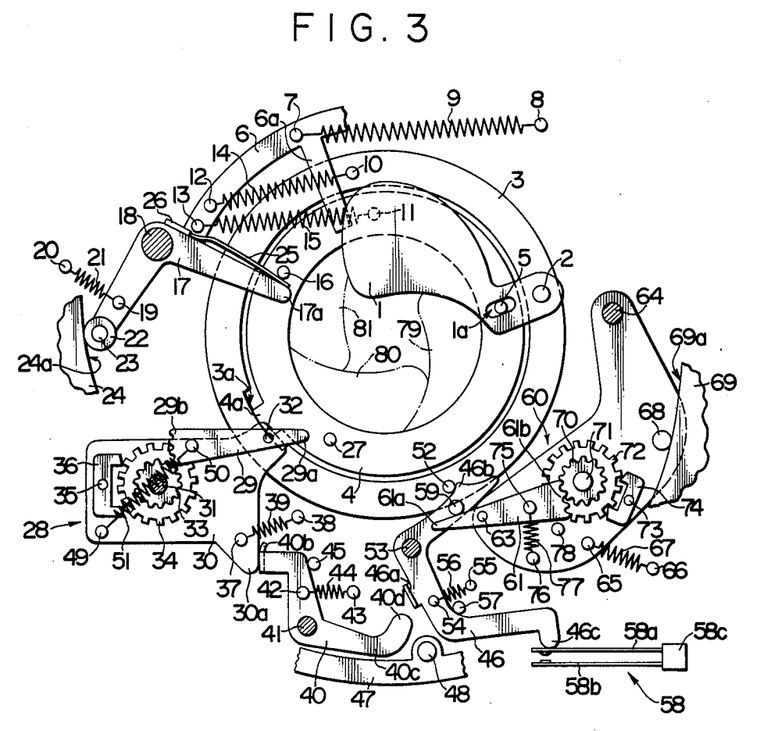
Figure 4:
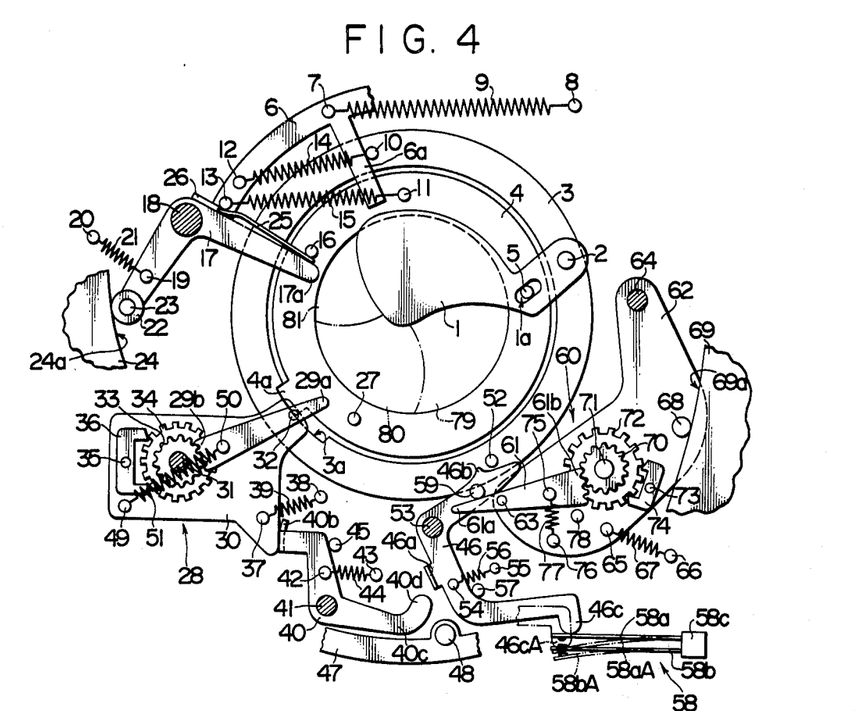

In the bladed shutter described above, both the shutter closing ring 3 and the shutter opening ring 4 also support a plurality of other shutter blades 79, 80 and 81, shown in phantom lines in FIGS. 2 to 4, in a similar manner to the support of shutter blade 1. The taking light path which extends through the shutter opening ring 4 is rendered either open or closed by the shutter blades 1, 79 to 81. In the initial condition shown in FIG. 1, the shutter blades maintain the light path fully open. It should be understood that the configuration and the number of the shutter blades as well as the manner of supporting the shutter blades on the rings 3, 4 can be changed as desired.

Figure 5:
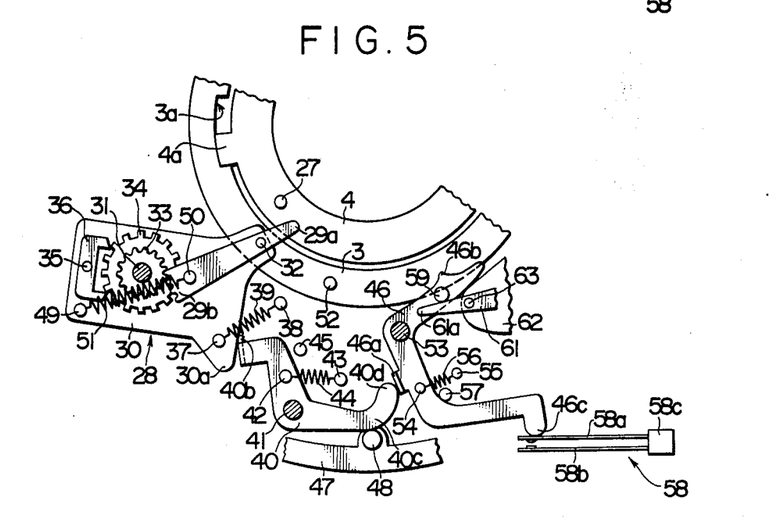
FIG. 5 is a fragmentary front view of the bladed shutter shown in FIG. 1, illustrating the operation thereof.
Figure 6:
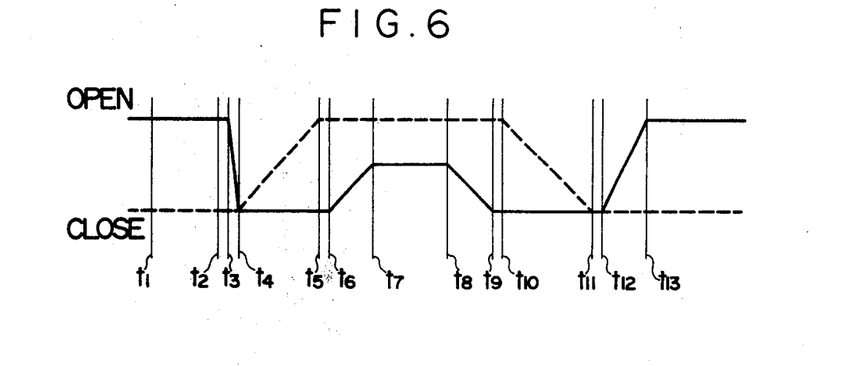
FIG. 6 is a timing chart which illustrates the operation of the bladed shutter.

Referring to FIGS. 1 to 6, the operation of the bladed shutter in a bladed shutter mode will be described. Initially, an interchangeable lens (not shown) having the bladed shutter assembled therein is mounted on a camera (not shown) with a focal plane shutter. The diaphragm lever 106, which is mounted on the camera, engages the arm 6b of the shutter charging ring 6 at time $t_1$, shown in the timing diagram of FIG. 6. At this time, the various components of the bladed shutter assume their initial positions shown in FIG. 1. It is to be noted that the diaphragm lever 106 may be replaced by a shutter drive lever. In FIG. 6, the degree of opening of the shutter blades 1, 79 to 81 at various times $t_1$, $t_2$... is indicated in solid line while the degree of opening of a focal plane shutter (not shown) which is inherently provided on the camera is indicated in broken lines. Under the initial condition, or at time $t_1$, all of the shutter blades remain fully open while the focal plane shutter is fully closed.

Now a film winding operation of the camera may be performed, and the diaphragm cam 24 and the shutter cam 69 of the bladed shutter may be externally operated to optimum settings. When the diaphragm cam 24 is operated, it causes the diaphragm presetting lever 17 to rotate, adjusting the relative positions of the arm 17a and the diaphragm pin 16 on the shutter opening ring 14 to optimum positions, thus determining a diaphragm aperture. When the shutter cam 69 is operated, it causes the governor 60 to rock, providing an optimum degree of engagement between the braking arm 61a of the gear 61 and the pressure pin 59 on the control lever 46, thus determining a shutter speed. At this time, the shutter speed of the focal plane shutter is preset to a value which is slightly slower than the shutter speed preset in the bladed shutter. It should be understood that the setting of the diaphragm and shutter speed values may be performed prior to the film winding operation.

When a shutter release operation is initiated, the diaphragm lever 106 moves from its position shown in FIG. 1 to its position shown in FIG. 2, driving the arm 6b of the shutter charging ring 6 from a position shown in FIG. 1 to a position shown in FIG. 2. The resulting counter-clockwise rotation of the ring 6 charges the coiled springs 14, 15 by extending them, whereby both the shutter closing ring 3 and the shutter opening ring 4 are energized for rotation in the direction of the arrow b. Also the coiled spring 9 is charged, storing a resilient energy for returning the shutter charging ring 6 to its initial position upon completion of a shutter operation.

The timing at which a shutter release is triggered is indicated by time $t_2$ in FIG. 6, and at the same time as both coiled springs 14, 15 are stressed in the manner mentioned above, they cause both rings 3, 4 to be displaced in the direction of the arrow b while maintaining the abutment of the projection 4a on the ring 4 against the leading edge of the notch 3a formed in the ring 3. Subsequently at time $t_3$ when the pin 27 on the shutter opening ring 4 bears against the braking arm 29a of the gear 29 of the governor 28, the shutter opening ring 4 is braked by the governor 28. When the shutter opening ring 4 is braked by the governor 28, only the shutter closing ring 3 which has been rotating together with the ring 4 continues to rotate. A rotation of the shutter closing ring alone ahead of the shutter opening ring 4 results in a gradual closing of the shutter blades 1, 79 to 81, and the picture taking light path is fully closed at time $t_4$ when the projection 4a on the ring 4 bears against the trailing edge of the notch 3a formed in the ring 3, as shown in FIG. 2.

At time $t_4$, when the light path is fully closed, the first blind of the focal plane shutter provided on the camera initiates its running in association with the upward movement of a mirror, which is initiated in response to a shutter release operation, and fully opens the focal plane shutter at time $t_5$. The time $t_4$ when the bladed shutter is fully closed is established so as to precede the initiation of running of the first blind of the focal plane shutter.

At time $t_5$ when the running of the first blind of the focal plane shutter is terminated and the focal plane shutter becomes fully open, the shutter opening ring 4, which has been constrained by the governor 28, has its pin 27 released from the governor 28, resuming rotation together with the shutter closing ring 3. The term interval during which the braking action of the governor 28 is applied is determined to an optimum value by design. Subsequently, when the governor pin 52 on the shutter closing ring 3 bears against the braking tab 46b of the control lever 46, the ring 3 is braked by the governor 60 through the lever 46 and the sector-shaped gear 61, and only the ring 4 continues to rotate ahead of the ring 3. This timing is indicated at $t_6$ in FIG. 6, and the running of the shutter opening ring 4 ahead of the shutter closing ring 3 causes the shutter blades 1, 79 to 81 to be opened. When the diaphragm pin 16 on the shutter opening ring 4 bears against the arm 17a of the diaphragm presetting lever 17 through the buffering spring 25, the opening movement of the shutter blades 1, 79 to 81 is interrupted, and therefore the taking light path is opened to a predetermined diaphragm aperture. This timing is indicated at $t_7$ in FIG. 6. The corresponding positions of the various parts of the bladed shutter are shown in FIG. 3.

The opening of the shutter blades 1, 79 to 81 to the predetermined diaphragm aperture is maintained subsequent to the abutment of the diaphragm pin 16 against the arm 17a of the diaphragm presetting lever 17 until time $t_8$ when the governor pin 52 is released from the braking tab 46b of the control lever 46 by the termination of operation of the governor 60. At this time, the pin 52 rotates while driving the lever 46 clockwise about the stud 53, so that the actuator 46c, of the lever 46 presses against the resilient contact blade 58a, as indicated in phantom line 46cA in FIG. 4. As a result of this action, the resilient contact blade 58a is brought into contact with the other resilient contact blade 58b (shown in phantom lines 58aA, 58bA) to close the X contact switch 58. The closure of the switch 58 represents a closure of the X contact, so that a strobo unit, if mounted on the camera, can be activated to produce a flash illumination. This takes place toward the end of the time interval during which the shutter blades maintain a maximum opening determined by a diaphragm aperture, or at time $t_8$.

When the governor pin 52 moves past the braking tab 46b of the control lever 46, the shutter closing ring 3 continues to rotate, so that the shutter blades 1, 79 to 81 initiate closure until the opening is fully closed at time $t_9$ (see FIG. 4) since the diaphragm pin 16 on the shutter opening ring 4 bears against the diaphragm presetting lever 17 to stop the shutter opening ring 4. When the pin 52 moves away from the lever 46, the latter allows the switch 58 to be opened.

The second blind (not shown) of the focal plane shutter begins its running immediately after the shutter blades are fully closed or at time $t_{10}$, and terminates its running at time $t_{11}$, fully closing the focal plane shutter. Subsequently at time $t_{12}$, after the focal plane shutter is fully closed, the diaphragm lever 106 on the camera returns from the position shown in FIG. 2 to the position shown in FIG. 1. In interlocked relationship therewith, the shutter charging ring 6 returns to its initial position. This causes the shutter closing ring 3 and the shutter opening ring 4 to be returned to their initial positions, causing the shutter blades 1, 79 to 81 to open again until they are fully open at time $t_{13}$. The various components of the bladed shutter have now returned to their respective initial positions shown in FIG. 1, thus completing one photographic cycle.

By turning the operation switching ring 47 clockwise from its position shown in FIG. 1 to its position shown in FIG. 5, the described bladed shutter may operate in a diaphragm mode.

Specifically, when the operation switching ring 47 is moved to the position shown in FIG. 5, the switching pin 48 raises the arm 40c of the operation converting lever 40, which therefore rotates counter-clockwise about the stud 41. The detent 40d of the lever 40 bears against the portion 46a of the control lever 46 to lock it while its arm 40a moves the support plate 30 of the governor 28 so as to retract the braking arm 29a of the sector-shaped gear 29 out of the path of rotation of the governor pin 27. When the braking arm 29a is moved out of the path of rotation of the pin 27, the shutter opening ring 4 responds to a shutter release by rotating in one stroke in the direction of the arrow b from its initial position shown in FIG. 1 until the diaphragm pin 16 thereon bears against the diaphragm presetting lever 17. The shutter closing ring 3 also rotates in one stroke in the same direction until the governor pin 52 thereon bears against the braking tab 46b on the control lever 46. At this time, the diaphragm presetting lever 17 is locked in a diaphragm position which is determined by the diaphragm cam 24, and the control lever 46 is locked against movement by the detent 40d, so that both rings 3, 4 are stopped at positions shown in FIG. 3, allowing the shutter blades 1, 79 to 81 to be opened to a given diaphragm aperture. In this instance, the shutter function is replaced by the focal plane shutter and the bladed shutter only serves as a diaphragm. Thus, the camera may be used as a usual camera with the focal plane shutter.

With the bladed shutter of the invention, the shutter blades 1, 79 to 81 are opened to a maximum value corresponding to a given diaphragm aperture, and the switch 58 is closed to provide a flash illumination by a strobo unit toward the end of the maximum opening or at time $t_8$ after a sufficient exposure has been given by natural light.

Figure 7:
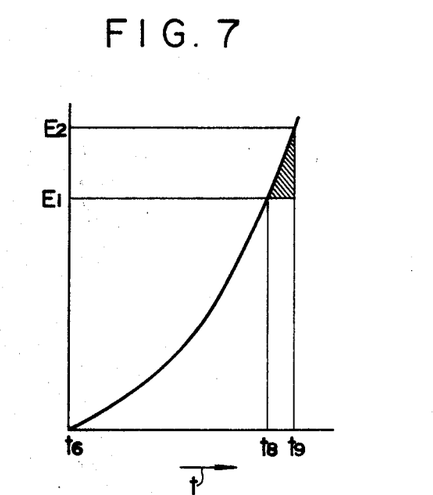
FIG. 7 graphically shows a manner of exposure achieved by the X contact of the bladed shutter.

The light intensity increases from zero to $E_1$ from time $t_6$ when the shutter blades begin to be opened until time $t_8$ when the switch 58 is closed, the exposure during such time interval being given by natural light. When the switch 58 is closed and a flashlight illumination from a strobo unit is provided, the light intensity increased from $E_1$ to $E_2$ until time $t_9$ is reached, thus providing an additional exposure from the strobo unit, as indicated by the hatched area of FIG. 7.

It is to be noted that means for closing the X contact switch is not limited to the control lever 46 interlocked with the governor pin 52, but may comprise any other suitable means such as a cam.

What is claimed is:

1. A camera, comprising:
   (A) a lens assembly for focusing external light on a focal plane of said camera;
   (B) a focal plane shutter located adjacent said focal plane and including first and second shutter blinds and means for consecutively running said shutter blinds responsive to the initiation of a shutter release operation;
   (C) operator actuable means for initiating said shutter release operation;
   (D) a plurality of shutter blades housed in said lens assembly;
   (E) operating means capable of moving said shutter blades between a fully open and fully closed position, said operating means being adapted to operate said shutter blades in a bladed shutter mode of operation responsive to the initiation of a shutter release operation; said bladed shutter mode of operation being that mode of operation wherein said shutter blades are:
      (1) placed into said fully closed position before said first blind begins to run;
      (2) placed into a preset intermediate open position after said first blind has completed its run but before said second blind begins to run, said preset intermediate open position corresponding to a desired aperture setting and lying between said fully open and said fully closed position; and
      (3) placed into said fully closed position a preset time period after said shutter blades are placed in said preset intermediate open position but before said second blind begins to run; and
   (F) externally adjustable aperture setting means cooperating with said operating means to determine the degree said shutter blades are open when they are in said preset intermediate position whereby said shutter blades cooperate with each other to function as both a bladed shutter and an aperture;
   (G) said operating means comprising:
      (1) concentric shutter opening and shutter closing rings, each of said shutter blades being pivotally connected to both of said rings in such a manner that said shutter blades move between said fully open and said fully closed position as a function of the relative angular orientation of said shutter opening and shutter closing rings;
      (2) a shutter opening governor means for retarding the angular movement of said shutter opening ring with respect to said shutter closing ring during the period of time when said shutter blades are moved into said fully closed position;
      (3) a shutter closing governor means for retarding the angular movement of said shutter closing ring with respect to said shutter closing ring during said preset period of time;
      (4) means for urging both of said rings to rotate responsive to the initiation of said shutter release operation.

2. The camera of claim 1 wherein said shutter closing governor means operates to change the relative angular orientation of said shutter opening and said shutter closing rings in such a manner that said shutter blades are moved into said fully closed position before said first blind begins to run and retains said shutter blades in said fully closed position until after said first blind completes its run.

3. The camera of claim 1 wherein said shutter opening governor means operates to change the relative angular orientation of said shutter opening and said shutter closing rings in such a manner that said shutter blades are moved into said preset open position after said first blind completes its run and thereafter are moved into said fully closed position before said second blind begins to run.

4. The camera of claim 1 wherein said shutter closing governor means includes means for enabling a camera flash unit at about the end of said preset time period.

5. The camera of claim 1 further including externally adjustable exposure setting means cooperating with said shutter closing governor means for controlling the length of preset period of time.

6. A bladed shutter comprising:
   a housing;
   a plurality of shutter blades disposed in said housing;
   a shutter opening ring rotatably mounted in said housing;
   a shutter closing ring rotatably mounted in said housing concentrically with said shutter opening rings;
   each of said shutter blades being pivotally connected to both said shutter opening and said shutter closing rings in such a manner that said shutter blades move between a fully open and a fully closed position as a function of the relative angular orientation of said shutter opening and said shutter closing rings;

diaphragm means for adjusting the degree of opening of said shutter blades by limiting the extent of rotation of said shutter opening ring with respect to said shutter closing ring;

shutter charging means adapted to coact with a diaphragm drive lever of a camera when said bladed shutter is coupled to said camera for energizing both of said rings resposive to movement of said drive lever;

a projection formed on one of said shutter rings and extending towards the other of said shutter rings; and a recess formed in said other of said shutter rings, said recess being adapted to receive said projection and to permit said shutter rings to move between a first and a second extreme angular orientation with respect to one another, said first angular orientation defining said fully open position of said shutter blades, said second angular orientation defining said fully closed position of said shutter blades.

7. A bladed shutter comprising:

a housing;

a plurality of shutter blades disposed in said housing;

a shutter opening ring rotatably mounted in said housing;

a shutter closing ring rotatably mounted in said housing concentrically with said shutter opening rings;

each of said shutter blades being pivotally connected to both said shutter opening and said shutter closing rings in such a manner that said shutter blades move between a fully open and a fully closed position as a function of the relative angular orientation of said shutter opening and said shutter closing rings;

diaphragm means for adjusting the degree of opening of said shutter blades by limiting the extent of rotation of said shutter opening ring with respect to said shutter closing ring;

shutter charging means adapted to coact with a diaphragm drive lever of a camera when said bladed shutter is coupled to said camera for energizing both of said rings responsive to movement of said drive lever; and said shutter charging means including a shutter charging lever and resilient means coupling said shutter charging lever to each of said rings, said shutter charging lever adapted to place said resilient means in a charged condition whereby said rings are biased to rotate in a predetermined direction, responsive to movement of said diaphragm drive lever.

8. A bladed shutter comprising:

a housing;

a plurality of shutter blades disposed in said housing;

a shutter opening ring rotatably mounted in said housing;

a shutter closing ring rotatably mounted in said housing concentircally with said shutter opening rings;

each of said shutter blades being pivotally connected to both said shutter opening and said shutter closing rings in such a manner that said shutter blades move between a fully open and a fully closed position as a function of the relative angular orientation of said shutter opening and said shutter closing rings;

diaphragm means for adjusting the degree of opening of said shutter blades by limiting the extent of rotation of said shutter opening ring with respect to said shutter closing ring;

shutter charging means adapted to coact with a diaphragm drive lever of a camera when said bladed shutter is coupled to said camera for energizing both of said rings responsive to movement of said diaphragm drive lever; and said diaphragm means including a lever located in a position where it will contact said shutter opening ring and prevent said shutter opening ring from rotating when the relative angular orientation of said shutter opening and said shutter closing ring is at a predetermined value corresponding to a desired diaphragm opening and wherein said lever includes a shock absorbing member for reducing the shock which results when said shutter opening ring contacts said lever.

9. A bladed shutter comprising:

a housing;

a plurality of shutter blades disposed in said housing;

a shutter opening ring rotatably mounted in said housing;

a shutter closing ring rotatably mounted in said housing concentrically with said shutter opening rings;

each of said shutter blades being pivotally connected to both said shutter opening and said shutter closing rings in such a manner that said shutter blades move between a fully open and a fully closed position as a function of the relative angular orientation of said shutter opening and said shutter closing rings;

diaphragm means for adjusting the degree of opening of said shutter blades by limiting the extent of rotation of said shutter opening ring with respect to said shutter closing ring;

shutter charging means adapted to coact with a diaphragm drive lever of a camera when said bladed shutter is coupled to said camera for energizing both of said rings; and means movable between a first and a second position for selectively operating said bladed shutter in a bladed shutter mode or in a diaphragm mode.

10. A camera, comprising:

(A) a lens assembly for focusing external light on a focal plane of said camera;

(B) a focal plane shutter located adjacent said focal plane and including first and second shutter blinds and means for consecutively running said shutter blinds responsive to the initiation of a shutter release operation;

(C) operator actuatable means for initiating said shutter release operation;

(D) a plurality of shutter blades housed in said lens assembly;

(E) operating means capable of moving said shutter blades between a fully open and a fully closed position, said operating means being adapted to operate said shutter blades in a bladed mode of operation responsive to the initiation of a shutter release operation; said bladed shutter mode of operation being that mode of operation wherein said shutter blades are:

(1) placed into said fully closed position before said first blind begins to run;

(2) placed into a preset open position after said first blind has completed its run but before said second blind begins to run; and (3) placed into said fully closed position a preset time period after said shutter blades are placed in said preset position but before said second blind begins to run; and (F) said operating means being further adapted to operate said shutter blades in a diaphragm mode responsive to a shutter release operation, said operating means including an operator actuatable switch movable between a first position wherein said operating means operates said shutter blades in said bladed shutter mode and a second position wherein said operating means operates said shutter blades in said diaphragm mode.

* * * * *